United States Patent [19]

Gallery, IV et al.

[11] E Patent Number: Re. 33,231

[45] Reissued Date of Patent: Jun. 12, 1990

[54] CONTAINER HAVING REMOVABLE CLOSURES

[76] Inventors: Daniel J. Gallery, IV, 11600 Shoshone, Westminster, Colo. 80234; Stanley A. Gallery, 11745 W. 66th Pl., Arvada, Colo. 80003

[21] Appl. No.: 331,247

[22] Filed: Feb. 27, 1989

Related U.S. Patent Documents

Reissue of:

[64] Patent No.: 4,469,239
Issued: Sep. 4, 1984
Appl. No.: 542,263
Filed: Oct. 17, 1983

[51] Int. Cl.[5] ..... B65D 43/14; B65D 51/04

[52] U.S. Cl. ..... 220/337; 220/334

[58] Field of Search ..... 220/334, 337, 338

[56] References Cited

U.S. PATENT DOCUMENTS

| | | | |
|---|---|---|---|
| 584,313 | 6/1897 | Adams | 220/337 X |
| 738,736 | 9/1903 | Steinmetz | 220/337 |
| 915,850 | 3/1909 | Gonser . | |
| 915,905 | 3/1909 | Thomas . | |
| 1,521,867 | 1/1925 | Chalavouta . | |
| 1,627,541 | 5/1927 | Katzinger . | |
| 1,940,578 | 12/1933 | Brainard | 220/337 X |
| 2,233,326 | 2/1941 | Rooney . | |
| 2,471,420 | 5/1949 | Elkin | 126/33 |
| 2,559,009 | 7/1951 | Coyle et al. . | |
| 2,592,412 | 4/1952 | Frohnapel . | |
| 2,747,388 | 5/1956 | Dolar | 220/334 X |
| 2,795,349 | 6/1957 | Cawood | 220/337 |
| 2,847,552 | 8/1958 | Gates | 219/43 |
| 2,936,878 | 5/1960 | Claude | 220/337 X |
| 3,392,870 | 7/1968 | Schulz . | |
| 3,850,342 | 11/1974 | Dsjuba | 220/337 X |
| 4,199,072 | 4/1980 | Jacks | 220/3.4 |
| 4,234,096 | 11/1980 | Hergaux | 220/334 |
| 4,308,972 | 1/1982 | McReynolds et al. | 220/337 X |
| 4,335,828 | 6/1982 | Robinson et al. | 220/334 |
| 4,345,697 | 8/1982 | Wilson et al. | 220/337 X |

*Primary Examiner*—Stephen Marcus
*Assistant Examiner*—Nova Stucker
*Attorney, Agent, or Firm*—Klaas & Law

[57] ABSTRACT

A container, particularly useful with steam tables, comprises an open top box like member which is provided with means extending between and supported by opposed side walls of the box like member and which means are constructed to form at least one slot. A pair of lids each having planar means depending from the bottom surface thereof are positioned over the box like member with the depending planar means in the slot so that a lid may be moved to an opened position, be retained in the opened position by its own construction while something is removed from the box like member and then returned to a closed position or, if desired, the lid may be removed completely from the box like member.

25 Claims, 2 Drawing Sheets

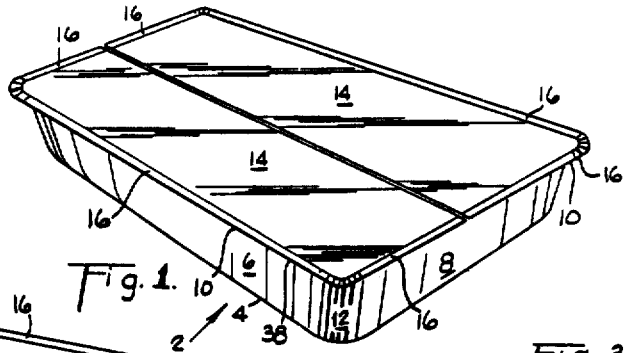
Fig. 1.
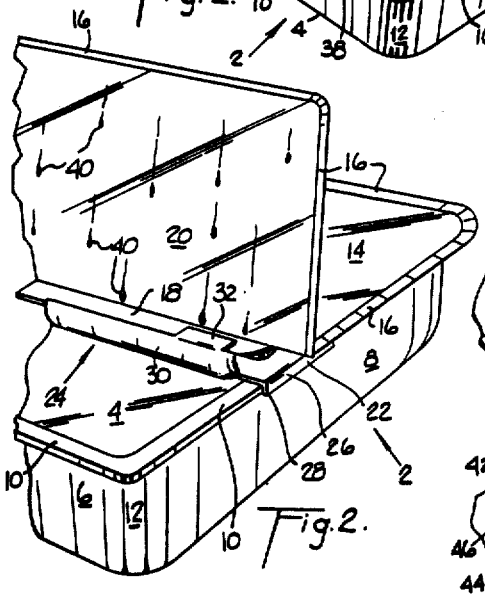
Fig. 2.
Fig. 3.
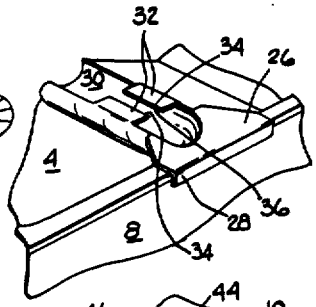
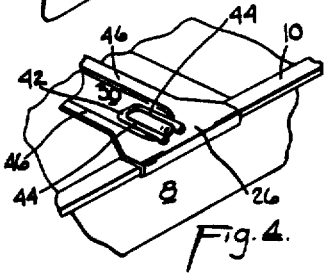
Fig. 4.
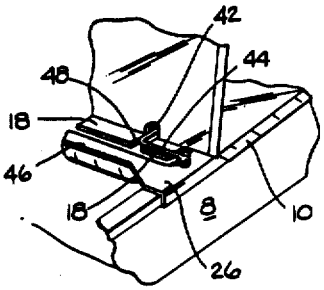
Fig. 5.

CONTAINER HAVING REMOVABLE CLOSURES

Matter enclosed in heavy brackets [ ] appears in the original patent but forms no part of this reissue specification; matter printed in italics indicates the additions made by reissue.

FIELD OF THE INVENTION

This invention is directed to the field of containers comprising box like members, having any desired configuration including round, and lids therefore and more particularly to containers having lids where it is desirable under some conditions to move the lid from a closed position over the box like member to an opened position over the box like member, to have the lid remain in the opened position while something is removed from the box like member and then to be moved from the opened position to the closed position or under other conditions to remove the lid completely from its position over the box like member. More specifically, the invention is directed for use in steam tables wherein the box like member will be positioned in the steam table and will be holding food and the lid will be normally in a closed position to keep the food hot. Under some conditions, the lid will only be opened to remove a portion of the food while under other conditions the lid will be completely removed from its position over the box like member.

BACKGROUND OF THE INVENTION

The use of steam tables for keeping food hot has been in existence for many, many years. Several types of lids have been provided for these containers such as those illustrated in U.S. Pat. Nos. 1,521,867 and 2,471,420. In these types of containers, the lids are not readily movable to an opened position and be retained in that position so that food can be removed and are of such a size to be bulky and awkward when it is desired to remove them completely from the container. In spite of the number of years of use of steam tables, there does not exist a simple and inexpensive way of providing a lid for a container for a steam table which is useable under a variety of conditions and is not bulky or awkward to handle. The foregoing problems also exist in keeping food at or below room temperatures. Another problem that exists relates to health and sanitation. In many instances, such as during rush hours, the lids would be removed from a plurality of containers and stacked somewhere. After the rush had diminished, the lids are put back on the container. Many times the lids will not be placed back on the same container. Also, during the time that the lids are removed, sanitary conditions for the lids and the food do not prevail.

BRIEF DESCRIPTION OF THE INVENTION

This invention is directed to a container comprising an open top box like member and a covering therefor which covering is readily positioned over the box like member and is comprised of a plurality of lids so that only a portion of the box like member needs to be exposed when a lid is opened. The hinge, with which the lid is operatively associated, comprises an elongated member that is supported by opposed side walls of the box like member. The elongated member is provided with means forming a slot. Each lid is provided with planar means depending from the bottom surface of the lid and adapted to be located in the slot. The planar means has a length less than the length of the lid. The lid has a length at least as long as that of the box like member so that the free end of the lid may be grasped and the lid pivoted around the means forming the slot, the bottom surface and planar means depending from the lid and portions of the lid in contact with a surface on the elongated member. When it is desired to remove the lid completely from the container, the free end of the lid may be grasped and the lid simply lifted out of the means forming the slot.

In the preferred embodiment, the box like member is provided with flanged shoulders on the upper edge of the sidewalls. The elongated member is provided at its extremities with means that extend over the top surface of the shoulders and around the edge of the shoulder so that the elongated member is in sliding contact with the shoulders. A trough extends between the extremities of the elongated member to provide a receptacle for any fluid, such as condensed steam, dripping from the lid when it is moved to an open position. Adjacent each end, the trough is provided with projections which are bent toward each other to form two spaced apart slots. The lid comprises a substantially planar sheet which is bent at one edge to provide a planar means depending from the bottom surface of the lid. The end portions of the planar means are cut off prior to bending so that the depending means has a length slightly less than the length of the trough. The lid is positioned on the container with portions of the depending planar means in each slot and the ends of the lid over the shoulders on the opposed edges and the flat surface on the elongated member. To raise the lid to an open position, the edge of the lid opposite the one edge is grasped and moved upwardly. The lid pivots around the means forming the slot, the bottom surface and depending planar means of the lid and the edges of the ends of the lid in contact with the surface of the elongated member. These various means are dimensioned so that when the lid has been moved through an angle slightly more than 90°, it may be released and will remain in that position.

It is an object of this invention to provide a container with a lid that is suitable for use under different conditions.

It is another object of this invention to provide a container with a lid that is simple in structure and may be readily removed from the container.

It is a further object of this invention to provide a container with a lid that may be readily opened and remain in an opened position.

It is still a further object of this invention to provide a container with means to receive any fluid dripping from the lid when in the opened position.

Other features and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

BRIEF DESCRIPTION OF THE DRAWINGS

FIG. 1 is a pictorial view of a container with the lids in a closed position;

FIG. 2 is a view of a portion of FIG. 1 with one lid in an opened position;

FIG. 3 is a view of a portion of FIG. 1 with the lids removed and showing a portion of the trough and one slot;

FIG. 4 is a view similar to FIG. 3 showing a modification of the slot;

FIG. 5 is a view similar to FIG. 4 showing a lid in opened position;

DETAILED DESCRIPTION OF THE INVENTION

Figure 6:
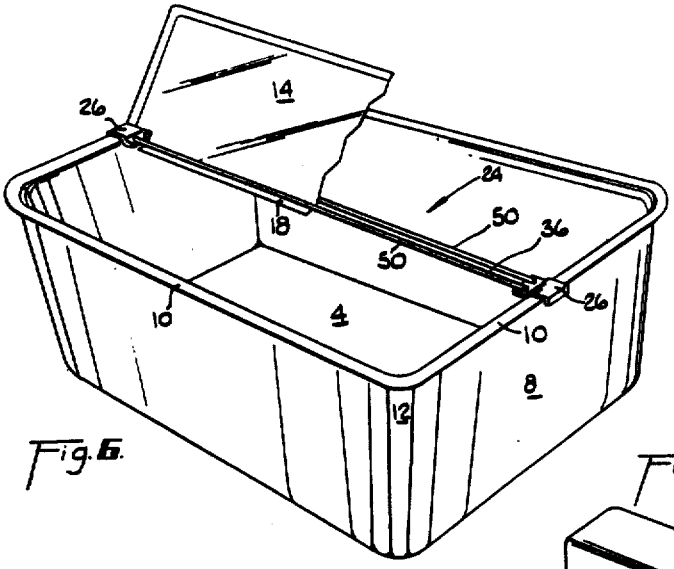
FIG. 6 is a pictorial view of another embodiment of the invention.

The preferred embodiment of the invention is illustrated in FIGS. 1–3 and comprises an open top box like member 2 which is integrally formed with a bottom 4 and side walls 6 and 8 with a flanged shoulder 10 on each side wall. The side walls 6 and 8 are joined by rounded corners 12. Although the preferred embodiment is illustrated as rectangular in shape with the side walls 6 longer than the side walls 8, it is to be understood that the container may have other configurations including round.

The covering for the container 7 comprises lids 14 each having three of its edges 16 bent downwardly so as to provide for a snug fit with the shoulders 10. The remaining edge 18 of each lid 14 is bent downwardly so as to depend from the bottom surface 20 of the lid 14 at an angle of about 90°. The edge 18 has a length less than the length of the lid 14 so as to provide an edge free end 22 on the lid 14. The lid 14 is shown as rectangular but it is understood that the lid 14 will have a shape corresponding to that of the container.

An elongated member 24 provides the connection between the lid 14 and the box like member 2. The elongated member 24 is integrally formed and is provided at each extremity with a support member 26 that has a depending portion 28 that is contiguous to the edge of the shoulder 10. A trough 30 extends between the support members 26. Adjacent but spaced from each support member 26 are a pair of tabs 32 having edges 34 facing each other but separated from each other at a desired distance to form a slot 36. The upper surfaces of the tabs 32 and the support members 26 are coplanar.

The container is assembled by placing the elongated member 24 onto the member 2 so that the support members 26 are in contact with and supported by the shoulders 10 of opposed side walls 8. Each lid 14 is then positioned by inserting the edge 18 into the slots 36 and then moved downwardly until the edges 16 of the lid are in contact with the shoulders 10. The edge 18 extends downwardly below the tabs 32 so that the bottom of the edge 18 is slightly below the top of the trough 30. The lid 14 is slightly larger than the pan 2 so that the edges 16 project a short distance past the shoulders 10. When it is desired to open one of the lids 14, a portion 38 of the lid 14 is grasped and moved upwardly which causes the lid 14 to pivot. The pivotal movement of the lid 14 results from the cooperation of the tabs 32, the edge 18 and the contact between the free end 22 and the upper surface of the support member 26. The pivotal movement of the lid 14 is continued until it has moved through an angle slightly greater than 90° at which time further movement is prevent by the cooperation between the tabs 32 and the edge 18. The lid 14 may be released and will be retained in this position. Downward movement of the lid 14 is prevented by the free end 22 in contact with the support member 26, pivotal movement is prevented by the cooperation between the tabs 32 and the edge 18 and the lateral separation of the tabs 32 and edge 18 is prevented by contact with the adjacent lid 14. Since the lid has been through an arc greater than 90°, gravity forces will hold it in this position. The lid is closed by reversing the opening operation.

When the lid 14 is in the open position, condensation droplets 40 will move over the bottom surface 20 until they reach the edge 18. If the build up of condensation is significant, the condensation will move over the edge 18 and drain into the trough 30 adjacent the support members 26. Any condensation remaining on the edge 18 will fall into the trough 30 when the lid 14 is moved to a closed position.

When it is desired to remove the lids 14 completely, the opposed edges 16 of each lid 14 are grasped and lifted directly upward so that the edge 18 moves out of the slots 36. After each lid 14 has been removed, the elongated member 24 is grasped and lifted upwardly.

A modification of the invention is illustrated in FIGS. 4 and 5. Instead of the tabs 32, a U-shaped member having a base 42 and legs 44 is provided. The ends of the legs 44 are secured to the support member 26 so that the base 42 is located over the trough 30. Also, the trough 30 is provided with projecting surfaces 46 for adding additional strength thereto. As illustrated in FIG. 5, an aperture 48 is provided in the edge 18 to provide a space for the base 42. The assembly and operation of this modification is essentially the same as that described above in relation to FIGS. 1–3 with the legs 44 cooperating with the edge 18 in the same manner as the tabs 32.

Another modification of the invention is illustrated in FIG. 6. Instead of the trough 30, a pair of parallel rods 50 extend between the support members 26 so as to form a continuous slot 36 therebetween. The edge 18 of the lid 14 is inserted into the continuous slot 36. If desired, a trough could also be provided between the support members 26.

Figure 8:
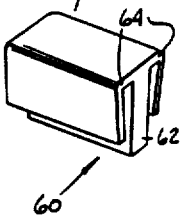
FIG. 8 is a pictorial view of the means used in FIG. 7 to separate the lids.
Figure 7:
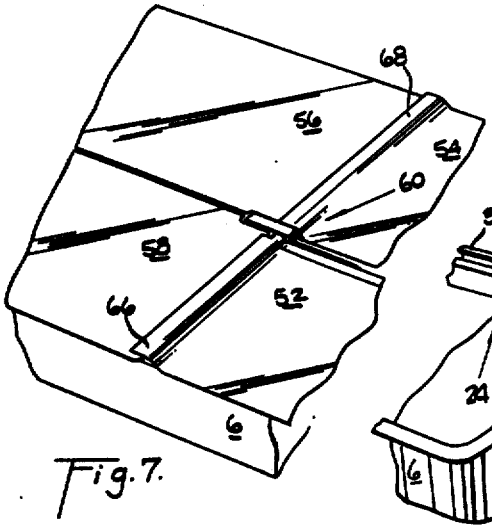
FIG. 7 is a modification of FIG. 6 showing additional lids.

In the modification of the invention illustrated in FIGS. 7 and 8, the covering for the container comprises four lids 52, 54, 56 and 58. The elongated member 24 is similar to that illustrated in FIG. 6. A T-shaped member 60 is positioned with the stem 62 between the rods 50 and the arms 64 supported on the rods 50. Each lid 52, 54, 56 and 58 is provided with an edge 18 which is positioned in the slot 36 and having cut out portions to provide for the T-shaped member 60. The lids 52 and 54 are slightly larger than the lids 56 and 58 so that portions 66 and 68 overlap the lids 56 and 58. If desired, the lids 52, 54, 56 and 58 can be of the same size and a strip could extend from the T-shaped member 60 to the side walls 6 to close any space between adjacent lids 52–58 and 54–56. The individual lids 52, 54, 56 and 58 are assembled and operated in a manner similar to that described above.

Figure 9:
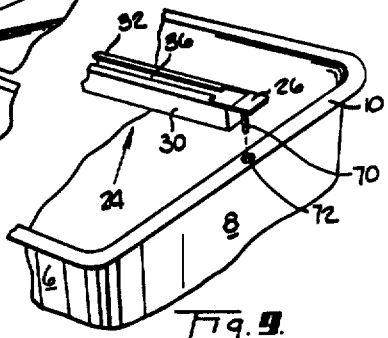
FIG. 9 is a pictorial view of a portion of another embodiment of the invention.

Another modification of the invention is illustrated in FIG. 9. In this modification, a trough 30 extends between and is integral with the support members 26. The tabs 32 are continuous from locations spaced a short distance from the support members 26 so as to form a continuous slot 36. A pin 70 is secured to the lower surface of each support member 26 and a hole 72 is provided in each shoulder 10 so that when the elongated member 24 is positioned in the box like member 2, the pins 70 will enter the holes 72 to insure proper positioning of the elongated member 24. Also, these means will insure that the elongated member remains in place. As in the other modifications, lids having edges 18 in the slot 36 would be provided to cover the pan.

In the preferred embodiment of the invention, the material used for the box like member 2, the lids 18 and the elongated member 24 comprises a stainless steel. This material is preferred for the use of the container to hold food and be located in a steam table. However, for this use and for other uses, the various components could be made from other materials such as plastic, nylons, wood, glass, and metal of any kind.

In one embodiment of the invention, the box like member 2 has a length of about 19.5 inches, a width of about 11.5 inches, a depth of about 6.0 inches and the shoulders 10 extend outwardly a distance of about 0.50 inch. Each lid 14 has a length of about 21.0 inches, a width of about 6.625 inches, the edge 18 extended below the bottom surface 20 a distance of about 0.375 inch and was about 19.0 inches in length. The elongated member 24 has an overall length of about 20.75 inches with the support members 26 having a width of about 4.0 inches. The trough 30 has a length of about 19.25 inches, a width of about 1.75 inches and a depth of about 0.75 inch. Each tab 32 has a length of about 0.25 inch and a width of about 1.50 inches and the slot 36 between the tabs has a width of about 0.25 inch.

While the preferred embodiments of the invention have been illustrated and described herein, it may be otherwise embodied and practiced within the scope of the following claims.

What is claimed is:

[1. A container comprising:

an open top box like member having a bottom wall and a plurality of side walls;

means extending between and supported by a pair of opposed side walls and having means defining at least one slot;

at least one lid having a bottom surface, portions of which are adapted to be supported by a plurality of said side walls; and planar means depending from said bottom surface and having at least a portion thereof located within said slot when said lid is in an operative position.]

[2. A container as in claim 1 wherein:

said means extending between and supported by a pair of opposed side walls is provided with means defining at least two spaced apart slots;

said slots are located to be in alignment; and said means depending from said bottom surface comprises at least portions thereof in each of said slots when said lid is in operative position.]

[3. A container as in claim 2 and further comprising:

supporting shoulders on the top edges of said side walls; and at least two lids of similar structure said planar means depending from the bottom surface of each lid being adjacent to each other when said lids are in operative position.]

4. A container [as in claim 3] *comprising:*

*an open top box like member having a bottom wall and a plurality of side walls;*

*means extending between and supported by a pair of opposed side walls and having means defining at least one slot;*

*at least one lid having a bottom surface, portions of which are adapted to be supported by a plurality of said side walls;*

*planar means depending from said bottom surface and having at least a portion thereof located within said slot when said lid is in an operative position;*

*said means extending between and supported by a pair of opposed side walls is provided with means defining at least two spaced apart slots;*

*said slots are located to be in alignment;*

*said means depending from said bottom surface comprises at least portions thereof in each of said slots when said lid is in operative position;*

*supporting shoulders on the top edges of said side walls;*

*at least two lids of similar structure said planar means depending from the bottom surface of each lid being adjacent to each other when said lids are in operative position; and wherein said means extending between and supported by a pair of opposed side walls comprises:* an elongated member having means adjacent each extremity thereof in contact with said supporting shoulders;

means on said elongated member for defining said at least two spaced apart slots; and means extending between said means adjacent each extremity of said elongated member for receiving and retaining fluid dripping from the said bottom surface of said lid when said lid is in an open position over said pan like member.

5. A container as in claim 4 wherein said means for receiving and retaining fluid dripping from said bottom surface comprises:

a trough extending between and connected to said means adjacent each extremity of said elongated member.

6. A container as in claim 5 wherein:

said means depending from said bottom surface of said lid is continuous between said means adjacent each extremity of said elongated member.

7. A container as in claim 6 and further comprising:

a pair of opposed projections extending from said trough adjacent each of said means adjacent each extremity of said elongated member; and each of said pair of opposed projections being bent inwardly toward each other so as to form said spaced apart aligned slots.

8. A container as in claim 6 and further comprising:

a U-shaped member secured to each of said means adjacent each extremity of said elongated member so that the base and portions of the legs of said U-shaped member are located over said trough; and apertures in said means depending from said bottom surface of said lid and portions of said lid for receiving at least portions of said bases of said U-shaped members.

9. A container as in claim 6 and further comprising:

a shoulder formed on the upper edges of said trough for providing additional support for said lid.

10. A container as in claim 9 wherein:

the means defining said slots and said means depending from said bottom surface of said lid are shaped to cooperate in holding said lid in an opening position at an angle slightly greater than about 90° from the top of said box like member.

11. A container as in claim [1] *4* and further comprising:

supporting shoulders on the top edges of said side walls; and at least two lids of similar structure with said planar means depending from the bottom surface of each lid being adjacent to each other when said lids are in operative position.

12. A container as in claim 11 wherein said means extending between and supported by a pair of opposed side walls comprises:

an elongated member having means adjacent each extremity thereof in contact with said shoulders; and means secured to each of said means in contact with said shoulder for providing a continuous slot therebetween.

13. A container as in claim 12 wherein:

same means depending from said bottom surfaces of said lids are continuous and have a length slightly less than the length of said continuous slot.

14. A container as in claim 13 wherein:

said means adjacent each extremity of said elongated member extends over a portion of the top surface of said shoulders and around the edges of said shoulders to provide for a sliding relationship of said elongated member over said shoulders.

15. A container as in claim 13 and further comprising:

means for providing a fixed location for said contact between said shoulders and said means adjacent each extremity of said elongated member.

16. A container as in claim 12 and further comprising:

a T-shaped member positioned so that the stem thereof passes through said slot and the arms thereof are around portions of said means for providing said slot to divide said slot into two slots;

at least four lids; and planar means depending from the bottom surface of each of said lids and located in said slots between said T-shaped member and said means adjacent each extremity of said elongated member.

17. A container as in claim 16 wherein:

at least two of said four lids have an area larger than the other two of said four lids so that portions of said two larger lids extend over portions of said other two lids.

18. A container as in claim 17 wherein:

said planar means forms an angle of about 90° with said bottom surface.

19. A container as in claim 13 wherein:

said planar means forms an angle of about 90° with each bottom surface.

20. A container as in claim 19 and further comprising:

means for providing a fixed location for said contact between said shoulders and said means adjacent each extremity of said elongated member.

*21. A container for use in steam tables for holding food to be dispensed therefrom comprising:*

*an open top box like member having a bottom wall and a plurality of side walls;*

*an elongated member extending between and supported by a pair of opposed side walls and having at least one slot formed therein;*

*at least one lid having top and bottom surfaces with portions of said bottom surface being supported by a plurality of said side walls when said at least one lid is in a closed position;*

*at least one edge depending downwardly from said bottom portion with portions thereof having planar surfaces facing in opposite directions and having portions thereof located in said at least one slot so that said at least one edge may be readily positioned in said at least one slot to assist in retaining said at least one lid at a relatively fixed position when said at least one lid is in a closed position or to assist in retaining said at least one lid in an opened position and for permitting said edge to be readily removed from said at least one slot when it is desired to separate said at least one lid from said box like member without any alteration of said planar surface characteristics;*

*said elongated member having top and bottom surfaces; and*

*said planar surfaces extending downwardly through said at least one slot so that other portions of said planar surfaces are located below said bottom surface of said elongated member.*

*22. A container as in claim 21 and further comprising:*

*said at least one edge having a length less than the length of said bottom surface in the same direction so as to provide spaced apart edge free ends located to contact portions of said elongated member supported by said opposed side walls; and*

*said edge free ends cooperating with said at least one edge and portions of said elongated member forming at least a portion of said slot to provide pivot means for providing pivotal movement of said at least one lid between said closed and opened positions.*

*23. A container as in claim 22 and further comprising:*

*holding means for holding said at least one lid in an opened position after it has been moved from a closed position to an opened position through an angle greater than 90 degrees.*

*24. A container as in claim 23 wherein said holding means comprises:*

*at least portions of said at least one edge in contact with portions of said elongated member adjacent to said slot; and*

*said edge free ends in contact with said portions of said elongated member supported by said opposed side walls.*

*25. A container as in claim 21 and further comprising:*

*said at least one edge having a length less than the length of said bottom surface in the same direction so as to provide spaced apart edge free ends located to contact portions of said elongated member supported by said opposed side walls; and*

*said edge free ends cooperating with said at least one edge and portions of said elongated member forming at least a portion of said slot to provide pivot means for providing pivotal movement of said at least one lid between said closed and opened positions.*

*26. A container as in claim 25 and further comprising:*

*holding means for holding said at least one lid in an opened position after it has been moved from a closed position to an opened position through an angle greater than 90 degrees.*

*27. A container as in claim 23 wherein said holding means comprises:*

*at least portions of said at least one edge in contact with portions of said elongated member adjacent to said slot; and*

*said edge free ends in contact with said portions of said elongated member supported by said opposed side walls.*

* * * * *